US011298866B2

(12) United States Patent
Suyama et al.

(10) Patent No.: US 11,298,866 B2
(45) Date of Patent: Apr. 12, 2022

(54) LIQUID BLOW MOLDING APPARATUS AND LIQUID BLOW MOLDING METHOD

(71) Applicant: DISCMA AG, Hunenberg (CH)

(72) Inventors: Kenichi Suyama, Kanagawa (JP); Yuichi Okuyama, Kanagawa (JP)

(73) Assignee: Discma AG, Zürich (CH)

( * ) Notice: Subject to any disclaimer, the term of this patent is extended or adjusted under 35 U.S.C. 154(b) by 468 days.

(21) Appl. No.: 15/570,171

(22) PCT Filed: Mar. 11, 2016

(86) PCT No.: PCT/JP2016/001397
§ 371 (c)(1),
(2) Date: Oct. 27, 2017

(87) PCT Pub. No.: WO2016/174809
PCT Pub. Date: Nov. 3, 2016

(65) Prior Publication Data
US 2018/0133948 A1    May 17, 2018

(30) Foreign Application Priority Data

Apr. 30, 2015  (JP) .............................. JP2015-093360

(51) Int. Cl.
*B29C 49/06*    (2006.01)
*B29C 49/46*    (2006.01)
*B65D 1/00*    (2006.01)
*B29C 49/58*    (2006.01)
*B29L 31/00*    (2006.01)
(Continued)

(52) U.S. Cl.
CPC .............. *B29C 49/06* (2013.01); *B29C 49/46* (2013.01); *B29C 49/58* (2013.01); *B65D 1/00* (2013.01); *B29C 2049/024* (2013.01); *B29C 2049/4602* (2013.01); *B29C 2049/4664* (2013.01); *B29C 2049/5803* (2013.01); *B29L 2031/712* (2013.01); *B29L 2031/7158* (2013.01); *B65D 1/0207* (2013.01)

(58) Field of Classification Search
None
See application file for complete search history.

(56) References Cited

U.S. PATENT DOCUMENTS

2011/0285063 A1    11/2011   Chauvin et al.
2013/0164404 A1    6/2013    Maki et al.
(Continued)

FOREIGN PATENT DOCUMENTS

JP    2013132856 A    7/2013
JP    2013132884 A    7/2013

*Primary Examiner* — Monica A Huson
(74) *Attorney, Agent, or Firm* — Eric J. Sosenko; Jonathan P. O'Brien; Honigman LLP

(57) ABSTRACT

A liquid-blow molding apparatus including a blow-molding mold that houses a preform leaving a mouth that serves as an open end thereof; a blow nozzle that supplies a pressurized liquid into the preform; a partition-wall member that closely surrounds a periphery of an outer-wall surface of the mouth of the preform and defines a mouth-external pressurized space with the outer-wall surface; and pressurized liquid-supply means for supplying a pressurized liquid into the mouth-external pressurized space so that pressure in the mouth-external pressurized space is higher than pressure inside the preform during liquid blow-molding.

10 Claims, 2 Drawing Sheets

(51) Int. Cl.
*B29C 49/02* (2006.01)
*B65D 1/02* (2006.01)

(56) References Cited

U.S. PATENT DOCUMENTS

| | | |
|---|---|---|
| 2014/0353884 A1 | 12/2014 | Sato et al. |
| 2014/0367895 A1* | 12/2014 | Sato ................. B29C 49/12 264/532 |
| 2015/0076105 A1 | 3/2015 | Sato et al. |
| 2015/0110915 A1* | 4/2015 | Tamura ............... B29C 49/58 425/524 |
| 2015/0246475 A1 | 9/2015 | Suyama et al. |

* cited by examiner

LIQUID BLOW MOLDING APPARATUS AND LIQUID BLOW MOLDING METHOD

FIELD OF THE INVENTION

The present invention relates to a liquid-blow molding apparatus and liquid-blow molding method that use a liquid to blow-mold a preform, formed in a closed-end tube shape using resin material, into a container having a predetermined shape.

BACKGROUND ART

Resin containers, as represented by polypropylene (PP) bottles or polyethylene terephthalate (PET) bottles, are used to contain various liquids, such as food, cosmetics, medicines, cleaning liquids, and toiletries, such as shampoo, or the like. This kind of container is generally manufactured by blow-molding a preform that is initially formed as a closed-end tube using resin material that has a thermoplastic nature.

A liquid-blow molding apparatus that blow molds a preform is known to include a blow-molding mold in which a preform is received and from which the mouth of the preform extends, and a blow nozzle that engages the mouth of the preform and liquid blow-molds the preform into a container having a predetermined shape by supplying pressurized liquid from the blow nozzle through the mouth into the preform. With this kind of liquid-blow molding apparatus, it is possible to use a liquid, such as a drink or the like, that is to be contained in the container as the final product, as the liquid that is supplied to the preform. For that reason, it is possible to simplify production processes and the constitution of the liquid-blow molding apparatus by omitting the subsequent process of filling container with the fluid.

Normally, with this kind of liquid-blow molding apparatus, the blow nozzle is sealed to the preform at a top surface of the mouth. For that reason, when the pressure of the liquid is applied to an inner surface of the mouth, by the pressurized liquid being supplied to the preform during liquid-blow molding, a gap is formed between the blow nozzle and mouth as a result of the mouth deforming and expanding in diameter because of the pressure, thereby causing a problem of liquid leaking from that gap.

Therefore, a liquid-blow molding apparatus like that disclosed in Japanese Unexamined Patent Application Publication No. 2013-132884, for example, forms a mouth-external pressurized space outside of an external wall surface of the mouth using a partition that closely surrounds a periphery of the external surface of the mouth of the preform. To suppress deformation expanding the mouth diameter, pressure, equal to the pressure inside of the mouth, is provided by supplying pressurized fluid, such as air or the like, within the mouth-external pressurized space during liquid-blow mold forming.

SUMMARY OF THE INVENTION

However, even with the conventional liquid-blow molding apparatus described above, when the inside of the preform is not filled by pressurized liquid, a water-hammer effect causes a peak pressure (water-hammer pressure) to be generated inside the preform such that deformation that expands the mouth diameter cannot be adequately suppressed, and liquid can leak from the mouth toward mouth-external pressurized space. When the blow nozzle is removed from the mouth after liquid-blow molding, any liquid that got into the mouth-external pressurized space will drip and cause the apparatus to become dirty.

Through incorporation of the principles of the present invention, the problem described above is resolved. An aspect of the present invention is therefore to provide a liquid-blow molding apparatus and liquid-blow molding method that reliably prevent liquid leaks that occur because of deformation expanding the diameter of the mouth of the preform when implementing liquid-blow molding.

Accordingly, in one aspect the present invention is a liquid-blow molding apparatus that liquid-blow molds a closed-end preform into a container having a predetermined shape, the liquid-blow molding apparatus is equipped with a blow-molding mold that defines a cavity inside, and which houses the preform while leaving a mouth of the preform exposed and serving as an open end thereof; a blow nozzle that supplies a pressurized liquid into the preform via the mouth of the preform; a partition-wall member that closely surrounds a periphery of an outer wall of the mouth of the preform and which forms a mouth-external pressurized space between the outer-wall of the mouth of the preform; and pressurized fluid-supply means for supplying a pressurized fluid into the mouth-external pressurized space so that the pressure in the mouth-external pressurized space becomes higher than the pressuring inside the preform during liquid-blow molding.

It is preferable that in the liquid-blow molding apparatus embodying the principles of the present invention and having the constitution described above, the pressurized liquid-supply means is constituted to supply pressurized liquid at a constant pressure in the mouth-external pressurized space.

It is preferable that in the liquid-blow molding apparatus embodying the principles of the present invention and having the constitution described above, the blow nozzle is constituted to include a guide tube that is inserted inside the mouth.

It is preferable that in the liquid-blow molding apparatus embodying the principles of the present invention and having the constitution described above, a seal member seals between the blow nozzle and the mouth of the preform.

It is preferable that in the liquid-blow molding apparatus embodying the principle of the present invention and having the constitution described above, the preform includes a circular neck ring, and the partition-wall member closely touches an entire circumference of the neck-ring.

It is preferable that in the liquid-blow molding apparatus embodying the principle of the present invention and having the constitution described above, the pressurized fluid-supply means is constituted to supply pressurized air in the mouth-external pressurized space.

It is preferable that in the liquid-blow molding apparatus embodying the principles of the present invention and having the constitution described above, a drive mechanism is disposed that moves the blow nozzle and the partition-wall member to approach and separate from the blow-molding mold.

In another aspect, the invention provides a liquid-blow molding method for forming a preform into a container having a predetermined shape by supplying pressurized liquid from the blow nozzle to inside the preform via a mouth of the preform, housing the closed-end preform in the blow-molding mold while leaving the opening of the mouth exposed, pressurizing the outer-wall surface toward an inside in the diameter direction at a pressure that is higher than the pressure in the preform by supplying pressurized fluid to the outer-wall face of the mouth when implementing liquid-blow molding.

It is preferable that in the liquid-blow molding method embodying the principles of the present invention and having the constitution described above, pressurized fluid is supplied at a constant pressure to the outer-wall face side of the mouth.

It is preferable that in the liquid-blow molding method embodying the principles of the present invention and having the constitution described above, pressurized air is supplied to the outer-wall surface side of the mouth.

According to the principles of the present invention, it is possible reliably to prevent mouth deformation that expands the mouth diameter, even with a peak pressure generated by a water-hammer effect inside the preform, because the pressure at the outer-wall surface side of the mouth is higher than the pressuring inside the preform when implementing liquid-blow molding, and reliably to prevent liquid leaks from between the blow nozzle and the mouth.

In this way, the present invention provides a liquid-blow molding apparatus and liquid-blow molding method that reliably prevent liquid leaks that occur as a result of deformation that expands the diameter of the mouth of the preform when implementing liquid-blow molding.

DETAILED DESCRIPTION

An example embodying the principles of the present invention will now be described in detail with reference to the drawings.

Figure 1:
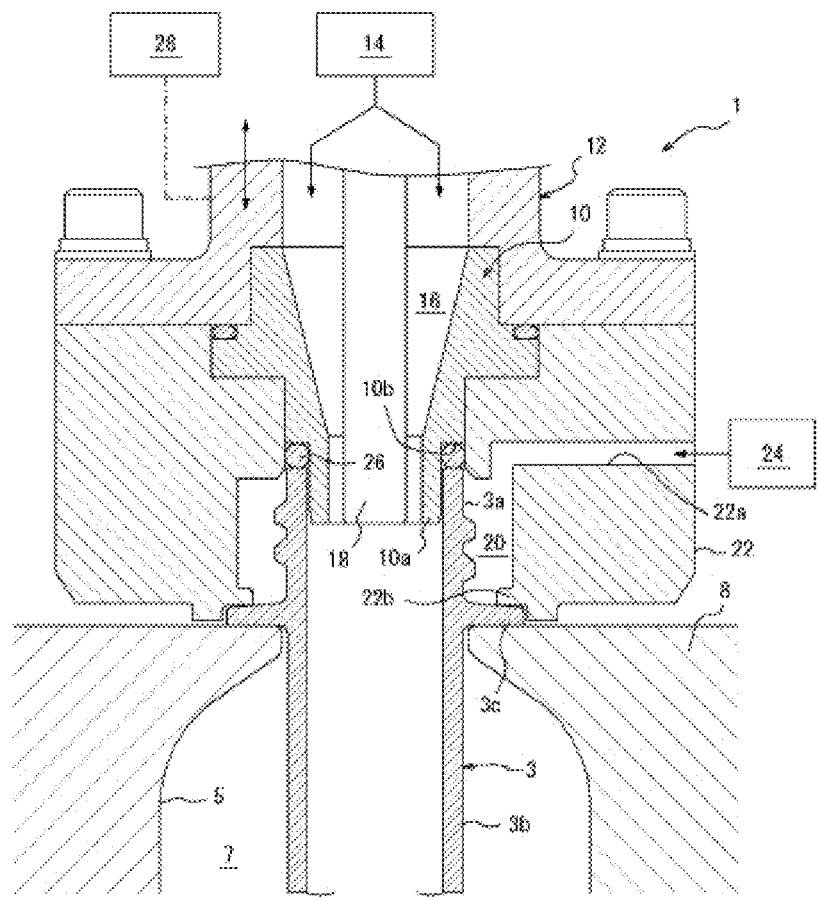
FIG. 1 is a sectional view of a liquid-blow molding apparatus embodying the principles of the present invention.

A liquid-blow molding apparatus 1 incorporating the principles of the present invention is depicted in FIG. 1 and liquid blow-molds a preform 3, provided in a closed-end tube shape of a resin material that has a thermoplastic property, into a container having a predetermined shape. Furthermore, liquid blow-mold formation is blow-molding that uses a pressurized liquid instead of pressurized air as a pressurized fluid supplied to the preform 3.

In this embodiment, the preform 3 has a shape that includes a cylindrical mouth 3a that serves as an open end thereof, a cylindrical body 3b that is connected to the mouth 3a, and a bottom end of the body 3b being closed; and a circular (flange-shaped) neck-ring 3c projecting in an outward radial direction at the bottom end of the mouth 3a. Also, it is possible to for the preform to have other shapes without being limited to the shape described above if the shape of the preform 3 is a closed-ended tube. Also, as shown in the drawing, a male thread is disposed along the outside of the mouth 3a to mount a cap. In other words the male thread is provided at an outer-wall surface (not shown in the drawings). It is also acceptable to dispose an engaging projection undercut on the outer-wall surface of the mouth 3a to engage the cap instead of male threads.

The liquid-blow molding apparatus 1 is equipped with a blow-molding mold 8 of a type (split-mold type) that defines a cavity 7 inside with a mold surface 5 having a shape that corresponds to a final shape of the container, such as a bottle for example. This blow-molding mold 8 encloses the preform 3, softened by being heated up to a predetermined temperature at which it expresses thermoplasticity, in the cavity 7 in a state that leaves the mouth 3a projecting upward from a top face of the blow-molding mold 8.

The liquid-blow molding apparatus 1 is equipped with a blow nozzle 10. The blow nozzle 10 is formed substantially into a tube shape, and is mounted to a bottom end of a support block 12 facing in an axial, up and down direction. This blow nozzle 10 engages the mouth 3a of the preform 3 from a top side to supply to the inside of the preform 3 pressurized liquid from a liquid-supply unit 14 via the mouth 3a.

As shown in the drawing, the blow nozzle 10 includes a guide tube 10a at a bottom end thereof. The guide tube 10a engages the mouth 3a in a state where it is inserted inside the mouth 3a of the preform 3. In such a case, it is preferable that the outer diameter of the guide tube 10a is slightly smaller than an inner diameter of the mouth 3a. This prevents a small gap from forming between the outer-wall face of the guide tube 10a and the inner wall face of the mouth 3a, causing damage to the inner wall face of the mouth 3a by the outer-wall face of the guide tube 10a and the inner wall face of the mouth 3a rubbing when the guide tube 10a is inserted inside the mouth 3a of the preform 3. Also, by supporting one blow nozzle 10 for the preform 3 equipped with mouth 3a having various bore sizes, the liquid-blow molding apparatus 1 is simplified. Also, the guide tube 10a may also be formed into a shape having a tapered face that narrows the diameter of its bottom end in the downward direction. This makes it possible to reliably insert the guide tube 10a into the mouth 3a.

The inside of the blow nozzle 10 serves as a flow path 16 that opens in the up and down directions of the blow nozzle 10. This flow path 16 is connected to a liquid-supply unit 14 via paths disposed inside the support block 12. The liquid-supply unit 14 supplies liquid, pressurized up to a predetermined pressure, to the flow path 16 in the blow nozzle 10. With such a constitution, it is possible to supply liquid from the liquid-supply unit 14 to the blow nozzle 10 and from the blow nozzle 10 to the mouth 3a of the preform 3 (arranged in the blow-molding mold 8) and to the inside the preform 3.

It is possible to adopt a constitution that uses a plunger pump as a pressurizing source, as the liquid-supply unit 14, but another constitution may also be used as long as it is able to supply a liquid pressurized to the predetermined pressure to the preform 3. Also, it is acceptable to use a content fluid such as a drink or the like, housed in the container after being formed into a final product as the pressurized liquid supplied by the liquid-supply unit 14.

As shown in the drawing, the liquid-blow molding apparatus 1 can be constituted to be equipped with an extension rod 18. In such a case, with the preform 3 being stretched in an axial direction by the extension rod 18 and with the preform 3 being stretched in the radial direction by the pressurized liquid being supplied through the mouth 3a biaxial stretch-blow molding is implemented. Also, the liquid-blow molding apparatus 1 can be instructed without the extension rod 18. In such a case, it is possible to increase a molding cycle by shortening molding time of the preform 3 into a container by raising the amount of liquid supplied per unit of time, in other words, by increasing a speed to raise the pressure in the preform 3 by expanding an effective opening area (opening area through which pressurized liquid passes) of the flow path 16.

In order to prevent deformation that expands the diameter of the mouth 3a when implementing liquid-blow molding, the liquid-blow molding apparatus 1 is equipped with a partition-wall member 22 that forms a mouth-external pressurized space 20 about the mouth 3a. The liquid-blow molding apparatus 1 is also equipped with a pressurized fluid-supply means 24 that supplies pressurized liquid to the mouth-external pressurized space 20.

The partition-wall member 22 is supported by the blow nozzle 10 and support block 12. The partition-wall member 22 closely surrounds the outer-wall surface of the mouth 3a of the preform 3 mouth 3a, and is formed to define the mouth-external pressurized space 20 between the outer-wall face of the mouth 3a. A communication path 22a is disposed in the partition-wall member 22; the mouth-external pressurized space 20 communicates to the pressurized fluid-supply means 24 by this communication path 22a. In the embodiment depicted in the drawing, a circular-shaped rib 22b is integrally disposed at a bottom end of the partition-wall member 22. The circular-shaped rib 22b closely touches an entire circumference at a top face of the neck ring 3c. The mouth-external pressurized space 20 is therefore sealed at the bottom end of the partition-wall member 22. Also, by closely adhering the bottom end of the partition-wall member 22 to the top face of the blow-molding mold 8, it is possible to attain a construction where the mouth-external pressurized space 20 is closely sealed at the bottom end of the partition-wall member 22.

The pressurized fluid-supply means 24 supplies pressurized fluid, in this instance a liquid into the mouth-external pressurized space 20 with a pressure that is higher than the pressure in the preform 3 supplied by the liquid from the liquid-supply unit 14 to the preform 3 during liquid-blow molding. At that time, it is preferable that the pressurized fluid-supply means 24 supplies pressurized liquid at a constant pressure in the mouth-external pressurized space 20.

Figure 2:
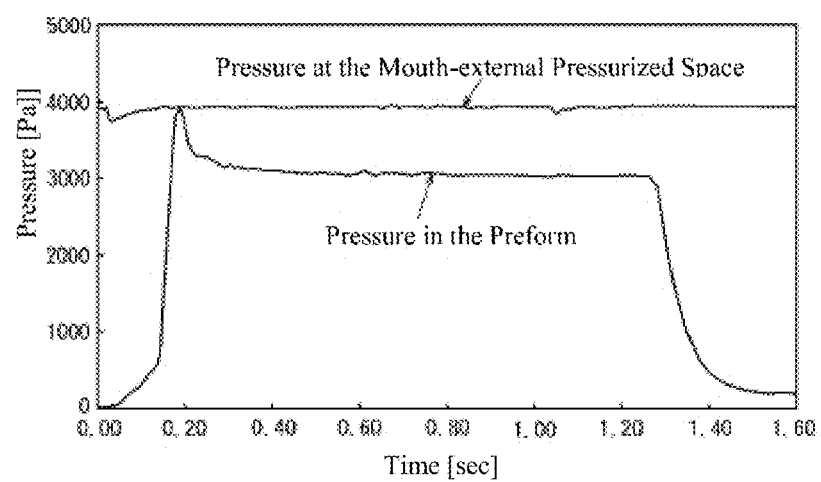
FIG. 2 is a diagrammatic view showing pressure in a preform and pressure in the mouth-external pressurized space when implementing liquid-blow molding.

As shown in FIG. 2, the pressure of the pressurized fluid that the pressurized fluid-supply means 24 supplies to the mouth-external pressurized space 20 is set to a higher pressure than a maximum pressure generated in the preform 3 when implementing liquid-blow molding. For example, a peak pressure is generated by the water-hammer effect when the pressurized liquid has not completely filled the inside of the preform 3, but the pressure of the pressurized fluid supplied by the pressurized fluid-supply means 24 to the mouth-external pressurized space 20 is set to a higher pressure than this peak pressure. Such a pressure setting is possible based on pressure data of the preform 3 obtained by implementing tests and the like in advance.

It is acceptable for the pressurized fluid supplied by the pressurized fluid-supply means 24 inside the mouth-external pressurized space 20 to be pressurized air. When a fluid supplied by the pressurized fluid-supply means 24 is a liquid, it is separately necessary to provide a means for recovering liquid in the mouth-external pressurized space 20 after the end of liquid blow-molding. However, when a fluid supplied by the pressurized fluid-supply means 24 is pressurized air, it is not necessary to provide such means for recovering the liquid. Rather, it is acceptable to discharge air from the mouth-external pressurized space 20 to the outside after finishing liquid-blow molding. In this manner it is possible to simplify the constitution of this liquid-blow molding apparatus 1.

Also, it is acceptable for the pressurized fluid supplied by the pressurized fluid-supply means 24 to the mouth-external pressurized space 20 to be another gas or liquid or the like, and is not limited to pressurized air.

If it is capable of supplying pressurized liquid to the mouth-external pressurized space 20 at a desired pressure between, it is acceptable to adopt a variety of constitutions of this kind of pressurized fluid-supply means 24, such as a pressure pump, air compressor or an accumulator that uses liquid pressure of the liquid-supply unit 14, or others for example.

A flat face 10b is disposed on the blow nozzle 10 to oppose a top end of the mouth 3a, the flat face 10b extending from a base end of the guide tube 10a in a radially outward direction. As seen in FIG. 1, seal member 26 is disposed between the mouth end (top end face) of the mouth 3a and the flat face 10b of the blow nozzle 10 to seal between the inside of the preform 3 and the mouth-external pressurized space 20. In such a case, it is also acceptable to use an O-ring, for example, as the seal member 26.

Also, a drive mechanism 28 is coupled to the support block 12. The drive mechanism 28 drives the blow nozzle 10 and the partition member 22, from the support block 12, in a direction towards or away from the blow-molding mold 8 (up and down directions in the figure) so as to engage and detach the blow nozzle 10 to the mouth 3a. Also, as a drive mechanism 28, it is possible to adopt a variety of constitution that uses an actuator such as an electric motor or hydraulic cylinder or the like.

Next, a method (a liquid-blow molding method according to the principles of the present invention) for liquid-blow a preform 3 into a container with a predetermined shape by using a liquid-blow molding apparatus 1, of the kind discussed above, will now be described.

Firstly, the preform 3, softened by being heated in advance to a predetermined temperature, is arranged in the blow-molding mold 8 leaving the mouth 3a, and is clamped to the mold.

Next, the drive mechanism 28 inserts the guide tube 10a of the blow nozzle 10 inside the mouth 3a of the preform 3 by moving the blow nozzle 10 and the partition-wall member 22 in a direction toward the blow-molding mold 8. At this time, the partition-wall member 22 is arranged about the outer-wall surface of the mouth 3a of the preform 3 and the circular-shaped rib 22b closely touches the entire circumference of the top face the neck-ring 3c. In this position, the mouth-external pressurized space 20 is tightly sealed between the outer-wall surface of the mouth 3a and the partition-wall member 22.

In this state, pressurized liquid from the liquid-supply unit 14 is supplied to the blow nozzle 10 and into the preform 3 through the mouth 3a. At this time, pressurized liquid (or pressurized air) is also supplied from the pressurized fluid-supply means 24 to the mouth-external pressurized space 20 by the pressurized fluid-supply means 24. The pressurized liquid provided to the mouth-external pressurized space 20 is at a higher pressure than the pressure in the preform 3 resulting from the liquid therein.

At this time, when liquid-blow molding is implemented by the pressurized liquid being supplied inside the preform 3, the pressure in the mouth-external pressurized space 20 is higher than the pressure in the preform 3 by pressurized liquid being supplied, and pressure is applied to the outer-wall surface of the mouth 3a that is greater than the pressure applied to the inner wall surface. In other words, when implementing liquid-blow molding, the outer-wall surface of the mouth 3a in the preform 3 is compressed in a radial inward direction by the higher pressure in the mouth-external pressurized space 20. This prevents the mouth 3a from deforming by expanding in diameter. For example, as shown in FIG. 2, even if the peak pressure is generated in the preform 3 by the water-hammer effect of the liquid supplied into the preform 3, the pressure inside the mouth-external pressurized space 20 is higher than the peak pressure. Even if the peak pressure is generated by the water-hammer effect inside the preform 3, this prevents deformation of the mouth 3a by in a radially outward, expanding direction, and it is possible reliably to prevent liquid leaks from between the blow nozzle 10 and the mouth 3a.

Also, as shown in FIG. 1, the guide tube 10a of the blow nozzle 10 is inserted into the inside of the mouth 3a. As a result, radially inward deformation tending to reduce the diameter the mouth 3a in a radially inward direction is prevented by the inner wall face of the mouth 3a touching the guide tube 10a.

As shown in FIG. 2, when liquid-blow molding is finished, the supply of the liquid from the blow nozzle 10 to the preform 3 is stopped. Thereafter, though not depicted in FIG. 2, the supply of pressurized liquid from the pressurized fluid-supply means 24 to the mouth-external pressurized space 20 is stopped. Next, the blow nozzle 10 and the partition-wall member 22 are moved upward by the drive mechanism 28 in a direction away from the blow-molding mold 8 and the blow nozzle 10 separates from the mouth 3a of the container after molding. Also, after mounting a cap to the mouth 3a of the container, the blow-molding mold 8 opens and the completed container is removed from the blow-molding mold 8. Also, it is acceptable to mount the cap to the mouth 3a of the container after the molded container has been removed from the blow-molding mold 8.

With the liquid-blow molding apparatus 1, the mouth-external pressurized space 20 is formed closely to the outer-wall surface side of the mouth 3a of the preform 3. In this way, it is reliably possible to prevent radial expansion of the mouth 3a, even when the peak pressure is generated by the water-hammer effect inside the preform 3, because the pressure in the mouth-external pressurized space 20 is higher than the pressure in the preform 3. And it is reliably possible to prevent liquid leaks from between the blow nozzle and the mouth, when implementing liquid-blow molding.

Also, with the liquid-blow molding apparatus 1 according to the principles of the present invention, the flat face 10b is disposed in the blow nozzle 10 to oppose the open end of the mouth 3a, and the seal member 26 is disposed between the open end of the mouth 3a and the flat face 10 and between the inside of the preform 3 and the mouth-external pressurized space 20. It is therefore possible to seal the inside of the preform 3 and the mouth-external pressurized space 20 at the outer-wall face of the mouth 3a using the common seal member 26 to simplify the structure of this liquid-blow molding apparatus 1.

Furthermore, with the liquid-blow molding apparatus 1 of the present invention, the guide tube 10a is disposed on the blow nozzle 10 and is inserted inside the mouth 3a, so it is possible to easily and reliably position the blow nozzle 10 and the partition-wall member 22 relative to the mouth 3a of the preform 3. Also, by disposing the guide tube 10a on the blow nozzle 10, it is possible to supply the liquid from the nozzle 10 into the preform 3 from a position that is close the body portion 3b of the preform 3, so it is possible to effectively suppress leaking of liquid from the mouth 3a.

Furthermore, with the liquid-blow molding apparatus 1 incorporating the principles of the present invention, the bottom end of the partition-wall member 22 closely touches the entire circumference of the neck-ring 3c of the preform 3 so the posture of the preform 3 is stabilized when implementing liquid-blow molding, and it is possible to form a higher quality container.

The present invention is not limited to the embodiment described above. Various changes may be implemented to a degree that does not deviate from the spirit of the invention.

For example, in the embodiment described above, the mouth 3a in preform 3 is formed into a tube shape. This is not a limitation. The mouth 3a for the preform 3 can also be a tapered shape with the open end larger than the side of the body portion 3b. In such a case, it is easy to insert the blow nozzle 10 (guide tube 10a) into the mouth 3a of the preform 3. Also, when implementing liquid-blow molding, a higher pressure is applied at the outer-wall face of the mouth 3a than the inner-wall face side making it possible to mold the mouth 3a into a cylinder shape after liquid-blow molding.

Also, with this embodiment, the outer diameter of the guide tube 10a of the blow nozzle 10 is formed to be slightly smaller than the inner diameter of the mouth 3a in the preform 3, but this is not a limitation. It is possible to form the diameter of the guide tube 10a into a shape with substantially the same diameter as the inner diameter of the mouth 3a of the preform 3; by fitting the guide tube 10a into the mouth 3a, it is possible to seal between the blow nozzle 10 and the mouth 3a.

Also, it is acceptable to constitute the blow nozzle 10 without the guide tube 10a.

The invention claimed is:

1. A liquid-blow molding apparatus that liquid-blow forms a closed-end, resin-made preform into a container having predetermined shape, the liquid-blow molding apparatus comprising:
a blow-molding mold defining a cavity;
a blow nozzle and a source of pressurized liquid, the blow nozzle being coupled to the source of pressurized liquid;
a preform having a tubular body that is closed on one end and that has an opening at the other defining a mouth, the preform being enclosed within the cavity of the blow-molding mold with the opening of the preform and mouth extending from the blow-molding mold;
a pressurized liquid in fluid communication with the source of pressurized liquid and being at a maximum pressure, the pressurized liquid also being in fluid communication with the mouth of the preform through the blow nozzle;
a partition-wall member defining a mouth-external pressurized space between the partition-wall member and an outer-wall surface of the mouth of the preform; and
a pressurized fluid located in the mouth-external pressurized space, the pressurized fluid being at a second pressure, the second pressure being greater than the maximum pressure.

2. The liquid-blow molding apparatus according to claim 1, wherein the blow nozzle includes a guide tube located inside the mouth of the preform.

3. The liquid-blow molding apparatus according to claim 1, further comprising a seal member located between the blow nozzle and the mouth of the preform.

4. The liquid-blow molding apparatus according to claim 1, wherein the preform includes a circular-shaped neck ring located at a bottom end of the mouth, and the partition-wall member being in circumferential engagement about the neck-ring.

5. The liquid-blow molding apparatus according to claim 1, wherein the pressurized fluid is pressurized air.

6. The liquid-blow molding apparatus according to claim 1, further comprising a drive mechanism connected to the blow nozzle and the partition-wall member, the blow nozzle and partition-wall member being moveable by the drive mechanism between an extended position located toward the blow-molding mold and a retracted position located away from the blow-molding mold.

7. A liquid-blow molding method for forming a preform into a container having a predetermined shape by supplying pressurized liquid inside the preform from a blow nozzle, the method comprising the steps of:

housing a closed-end of the preform in a blow-molding mold while leaving a mouth of the preform accessible from outside of the blow-molding mold, pressurizing an outer-wall surface of the mouth of the preform radially inward with a pressurized fluid at a second pressure, injecting the pressurized liquid into the preform at a first pressure, inducing a peak pressure within the preform and forming the container from the preform, the peak pressure being greater than the first pressure, wherein the second pressure of the pressurized fluid is greater than the peak pressure.

8. The liquid-blow molding method according to claim 7, wherein pressurized fluid supplied to the outer-wall face of the mouth is supplied at a constant pressure.

9. The liquid-blow molding method according to claim 7, wherein the pressurized fluid supplied to the outer-wall face of the mouth is pressurized air.

10. The liquid-blow molding method according to claim 7, wherein the pressure of the pressurized fluid is greater than a peak pressure induced by water hammer within the preform.

* * * * *